July 3, 1934.                D. W. DECKER                1,964,976
                        SIDE SHIFT FOR TRACTOR PLOWS
                          Filed April 13, 1933        2 Sheets-Sheet 1

INVENTOR
DANIEL W. DECKER
By Adam E. Fisher
ATTORNEY

July 3, 1934.  D. W. DECKER  1,964,976
SIDE SHIFT FOR TRACTOR PLOWS
Filed April 13, 1933  2 Sheets-Sheet 2
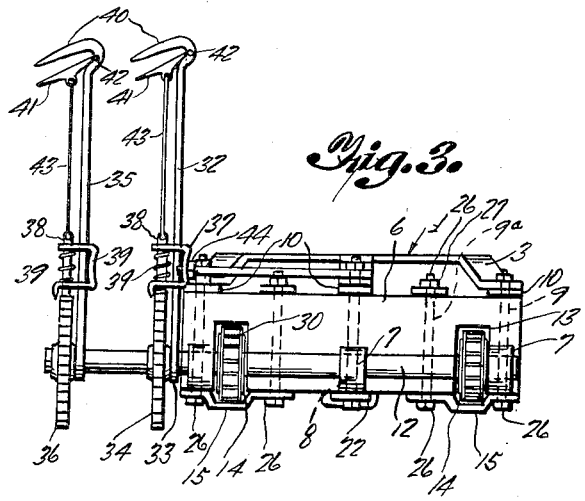
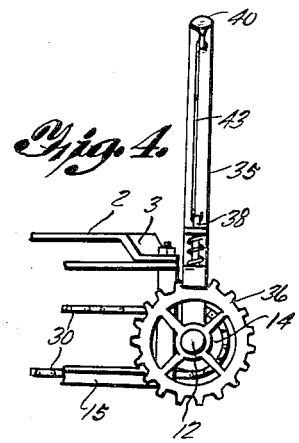
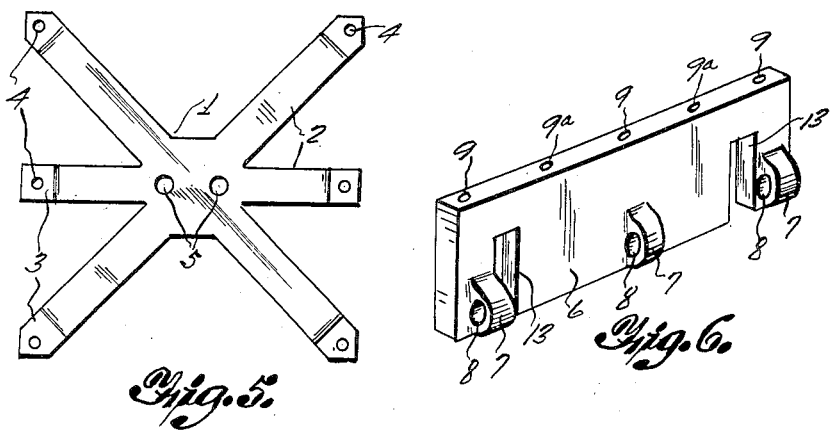
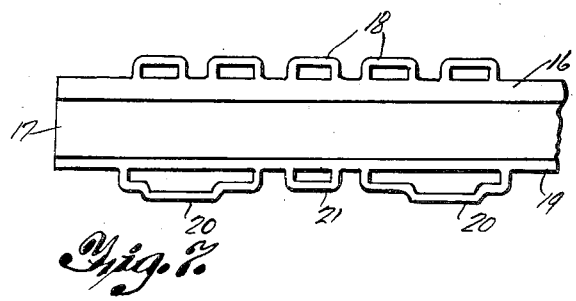
INVENTOR
DANIEL W. DECKER
By Adam E. Fisher
ATTORNEY Patented July 3, 1934

1,964,976

UNITED STATES PATENT OFFICE 1,964,976

SIDE SHIFT FOR TRACTOR PLOWS

Daniel W. Decker, Milroy, Pa.

Application April 13, 1933, Serial No. 665,876

4 Claims. (Cl. 280—33.10)

This invention relates to side shifts or side hill shifts for tractor plows.

The object of the invention is to provide in a relatively simple, practical and durable form, a means for shifting tractor plows up or down when plowing along a hillside.

Another object is to provide a form of boxing, housing or frame for mounting to the lower side of the rear axle of a tractor, the same being adapted to freely engage the end of the movable draw-bar of the tractor to which the plows are attached, with means for shifting the draw-bar to one side or the other of the center of the rear axle, to accommodate or meet the exigencies of plowing upon a hillside.

With these and such other objects and advantages in view as may be developed in the course of the following specification, attention is directed to the accompanying drawings, the same embodying a preferred form of the invention, and wherein Figure 1 is a plan view of the invention as mounted in place upon the rear axle of a standard form of tractor, the rear portion and wheels alone of the tractor being shown, and the wheels being partly broken away.

Figure 4 is a rear end elevation of the right hand side of the device and showing the rearmost operating lever and sprocket.

Figure 5 is a top plan view of the spider constituting the upper portion of the housing which engages the draw-bar of the tractor.

Figure 6 is a perspective detail of one of the side, shaft plates of the device, showing the shaft bars formed thereupon.

Figure 7 is a side elevation of the rear end of the tractor draw-bar, with supporting brackets mounted at the upper and lower sides thereof.

Figure 8 is a detail of one of the operating shafts.

Figure 1:
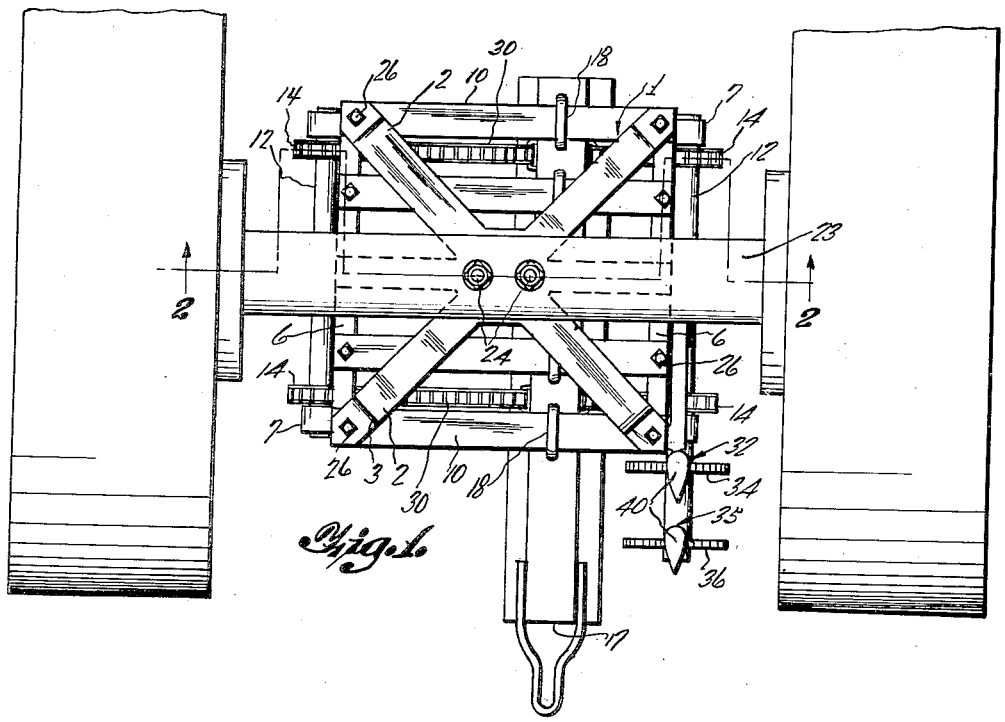
Figure 2:
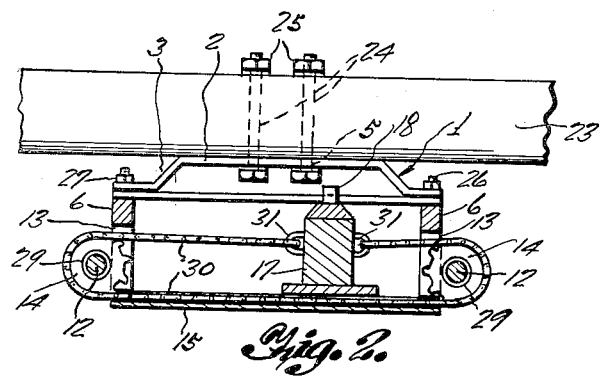
Figure 2 is a section on the line 2—2 of Figure 1.
Figure 3:
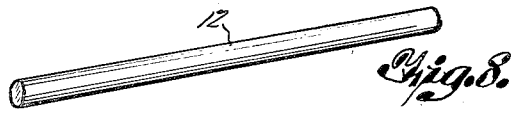
Figure 3 is a side elevation of the device alone.

The invention comprises a spider 1 formed with the integral radial arms 2, the extremities of which define a rectangular plane as shown, the said extremities being offset from the body of the spider, as shown at 3, and pierced with bolt holes 4. The center of the spider is pierced with relatively large bolt holes 5. Two side shaft plates 6 are provided each having the aligned shaft bosses or bearing lugs 7 formed integrally along the intended lower and outer margins thereof, the said lugs being pierced through by the aligned shaft bores 8. These plates are also pierced through from top to bottom by the bolt holes 9 and 9a, the end and center holes 9 of each plate being in registry with the three aligned bolt holes 4 in the extremities of the arms 2, at each side of the spider 1. Three flat top cross bars 10 are provided, of a length to reach across the spider and having in their ends bolt holes adapted to align with the holes 4 and 9 for assembling the device. Two sprocket shafts 12 are journaled through the bores 8 of the lugs 7, the shaft 12 at the right hand side of the device when assembled being the operating shaft and being somewhat longer than its companion shaft 12 for the left side, to enable it to carry an extra sprocket, as will be later explained. Sprocket slots 13 are cut through the plates 6 at each end thereof, and sprockets 14 are rigidly mounted upon the ends of the shafts 12 and adapted to rotate through the slots 14. Two channeled bottom end bars 15 are provided of equal length with the bars 10, and are likewise pierced with bolt holes at their ends to register with the holes 9 and 9a in the assembling of the device. A top bracket plate 16 is mounted upon the upper side of the draw bar 17, the same having the spaced loops or staples 18 through which may freely pass the flat top bars 10 of the assembly and likewise a bottom bracket 19 is mounted at the lower side of the draw bar, the same having the spaced bar loops 20 at the ends and the central bar loop 21. A flat bottom cross bar 22 with bolt holes at each end, is also provided, similar to the bars 10 at the top of the assembly. The elements so far described are assembled by bolting the spider 1 to the rear axle 23 by bolts 24 up through the holes 5 of the spider and through the axle as shown and turning down the nuts 25 tightly. The top bars 10, bottom central cross bar 22 and bottom end channeled bars 15 are then slid through the loops 18, 21 and 20 respectively of the plates 16 and 19 of the draw bar. The side plates 6 are then positioned between the ends of these bars and long bolts 26 are passed through the aligned holes at the ends of the bars and the holes 9 and 9a of the side plates, and the nuts 27 being turned up, the assembly is locked firmly together in place. The sprocket wheels 14 are positioned in the slots 13 of the plates 6 and the shafts 12 are passed through the bores 8 and the hubs 29 of the sprockets 14, the sprockets being locked to the shafts in any conventional manner. Sprocket chains 30 are passed over the sprocket wheels and have their ends anchored at 31 to either side of the draw-bar 17.

An inner or locking lever 32 is journaled at 33 upon the end of the longer right hand shaft 12, and a ratchet wheel 34 is next rigidly mounted upon the shaft. A similar outer or operating lever 35 and ratchet wheel 36 are similarly mounted at the extremity of the said shaft 12. Looped or U-shaped brackets 37 are medially mounted upon the said levers and ratches 38 are passed slidably through these brackets and adapted at their lower ends to engage the wheels 34 and 36. Coil springs 39 are mounted over the ratches and have their lower ends anchored to the ratches, their upper ends being braced against the upper legs of the brackets 37. Thus the ratches are normally pressed into engagement with the wheels 34 and 36. The levers 32 and 35 have the offset handles 40 and cooperating ratch handles 41 are pivoted at 42 to the levers immediately below. Connecting rods 43 operatively join the handles 41 with the upper ends of the ratches 38. The inner lever 32 is locked permanently in an uprght position by means of a bolt 44 extended from the assembly.

In operation, the draw-bar 17 may be readily shifted from side to side by releasing or freeing the ratch of the inner lever 32 and then pulling or pushing upon the outer or operating lever 35. After the draw-bar is thus moved as desired, the ratch of the inner lock lever is again allowed to engage its ratch wheel, thus locking the draw-bar to the desired position. In this operation, the flat bars 10, 22 and 15 readily slide through the described loops provided for them, while the chains 30 slide along the channels of the lower end bars 15. Thus the draw-bar in its lateral movements does not contact or interfere with the said chains. The offset formation of the spider at 3 spaces the bars 10 therefrom, thereby providing room for the passing of the upper plate 16 and loops 18. As a matter of course any plows hitched at the end of the draw-bar, will also be shifted with the bar.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, a frame comprising side plates connected and spaced apart by upper and lower laterally extended and parallel cross bars, a spider comprising a central mounting portion and radially extended arms secured to the said side plates, a draw bar slidably mounted between the cross bars in parallelism with the side plates, and staples on the upper and lower sides of the draw bar and slidably embracing the said frame cross bars.

2. In a device of the kind described, a frame comprising side plates, spaced parallel cross bars extended across, above and below the side bars, and secured at their ends thereto, a spider comprising a central mounting portion and radially extended arms secured at their ends to the junctions of the upper cross bars and side plates, a draw bar slidably mounted between the upper and lower side bars, upper and lower bracket plates on the draw bar and spaced staples on the said bracket plates slidably embracing the said cross bars.

3. In a device of the kind described, a frame comprising side plates, spaced parallel cross bars extended across, above and below the side bars, and secured at their ends thereto, a spider comprising a central mounting portion and radially extended arms secured at their ends to the junctions of the upper cross bars and side plates, a draw bar slidably mounted between the upper and lower side bars, upper and lower bracket plates on the draw bar and spaced staples on the said bracket plates slidably embracing the said cross bars, the said side plates of the frame having bearings, shafts journaled through the bearings, means for rotating one of the shafts, sprockets mounted on the shafts, and parted sprocket chains trained over the sprockets and secured at their ends to the draw bar.

4. In a device of the kind described, a frame comprising side plates, bearings on the side plates, shafts journaled through the bearings alongside the side plates, sprockets mounted adjacent the ends of the shafts, upper cross bars extended in parallelism between the side plates and secured at their ends thereto, channeled lower cross bars extended between the side plates in alignment with the sprockets and secured at their ends to the plates, a draw bar mounted between the cross bars at right angles thereto, staples on the upper and lower sides of the draw bar slidably engaging the said cross bars, parted sprocket chains trained over the said sprockets and attached at their ends to the draw bar, the said chains running in and through the channels in the lower cross bars.

DANIEL W. DECKER.